United States Patent
McElvain

(10) Patent No.: US 7,710,609 B2
(45) Date of Patent: May 4, 2010

(54) PAGE EDGE CORRECTION SYSTEMS AND METHODS

(75) Inventor: Jon S. McElvain, Manhattan Beach, CA (US)

(73) Assignee: Xerox Corporation, Norwalk, CT (US)

(*) Notice: Subject to any disclaimer, the term of this patent is extended or adjusted under 35 U.S.C. 154(b) by 1191 days.

(21) Appl. No.: 11/135,742

(22) Filed: May 24, 2005

(65) Prior Publication Data

US 2006/0268296 A1 Nov. 30, 2006

(51) Int. Cl.
*G06F 15/00* (2006.01)
*G06K 9/36* (2006.01)

(52) U.S. Cl. ......... 358/3.27; 358/1.1; 358/1.9; 358/3.26; 358/518; 382/162; 382/167

(58) Field of Classification Search ......... 358/1.9, 358/1.15, 3.26, 518, 3.27; 382/162, 167
See application file for complete search history.

(56) References Cited

U.S. PATENT DOCUMENTS

| | | | |
|---|---|---|---|
| 4,905,017 A | | 2/1990 | Sugitani et al. |
| 5,995,248 A | * | 11/1999 | Katori et al. ............. 358/2.1 |
| 6,262,747 B1 | * | 7/2001 | Rocheleau et al. ......... 345/620 |
| 6,345,117 B2 | * | 2/2002 | Klassen ................ 382/167 |
| 6,781,720 B1 | * | 8/2004 | Klassen ............... 358/3.27 |
| 7,123,381 B2 | * | 10/2006 | Klassen ................ 358/1.9 |
| 7,139,098 B2 | * | 11/2006 | Klassen ................ 358/1.9 |
| 7,173,738 B2 | * | 2/2007 | Kohn .................. 358/2.1 |
| 7,331,655 B2 | | 2/2008 | Nystrom et al. |
| 7,339,701 B2 | * | 3/2008 | McElvain .............. 358/1.9 |
| 2001/0033686 A1 | * | 10/2001 | Klassen ............... 382/167 |
| 2003/0011796 A1 | * | 1/2003 | Kohn ................. 358/1.9 |

(Continued)

FOREIGN PATENT DOCUMENTS

EP 1 091 565 A2 11/2001

(Continued)

OTHER PUBLICATIONS

Xerox Corporation, Chinese Patent Application No. 200610084426.5, Chinese Office Action Communication, Apr. 24, 2009, 5 pages.

(Continued)

*Primary Examiner*—Twyler L Haskins
*Assistant Examiner*—Kent Yip
(74) *Attorney, Agent, or Firm*—Gibb I.P. Law Firm, LLC

(57) ABSTRACT

Method and system embodiments herein add at least one trap area between abutting objects on an image to be printed by a printing engine. This trap area includes a central region between two outer regions. The method/system establishes a target toner concentration for pixels within the trap area based on toner concentrations of the abutting objects and corrects the target toner concentration to account for irregularities of the outer regions of the trap area to produce a corrected toner concentration for pixels in the trap area. The method/system performs this correction by first empirically testing the printing engine to establish a lookup table of correction values of the outer regions prior to a printing operation. Then, during the printing operation, the method determines a size relationship (weighting) between the central region and the outer regions for the trap area and calculates the corrected toner concentration.

16 Claims, 7 Drawing Sheets

U.S. PATENT DOCUMENTS

2003/0090689 A1* 5/2003 Klassen .................. 358/1.9
2004/0114162 A1 6/2004 McElvain

FOREIGN PATENT DOCUMENTS

JP 8-307723 11/1996

OTHER PUBLICATIONS

Notice of Reasons for Rejection (Office Action) Japanese Patent Appln. No. 2006-142821, Dec. 1, 2009, pp. 1-2.
Brief English Language Translation Summary of Notice of Reasons for Rejection (Office Action) Japanese Patent Appln. No. 2006-142821, Dec. 1, 2009, pp. 1-2.

* cited by examiner

PAGE EDGE CORRECTION SYSTEMS AND METHODS

BACKGROUND

Embodiments herein generally relate to corrections made to trap areas that are added between abutting objects on an image to be printed by a printing engine.

The art of color printer calibration has been well studied, the applications of which can be found in several consumer products today. Most of these methods employ the Neugebauer approach, whereby a series of uniform area patches is measured to develop a set of equations to describe the reflectance of a halftone pattern on paper. This set of equations, denoted the "printer model" is then inverted to determine one or more lookup tables, used to produce the desired printer output. These lookups will generally produce smooth monotonic output for each channel, and for CMYK (cyan, magenta, yellow, black) printers there may be an additional requirement to achieve gray balance between (CMY) and K. In many marking systems, in particular those involving electrophotography, the ink/toner densities at halftoned edges can be quite different relative to uniform regions.

As described in U.S. Patent Publication 2004/0114162, to McElvain, incorporated herein by reference, electronic processing of graphic and text images produces multi-color prints using multiple color separations. Typically, four process colors, cyan, magenta, yellow and black, are used to print multiple separations, which tend to have minor misregistration problems. The result of abutting or overlapping shapes is a boundary between adjacent regions of color that, under ideal printing conditions should have zero width. That is, one color should stop exactly where the abutting color begins, with no new colors being introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice therefore, the realization of a zero width boundary between regions of different color is impossible as a result of small but visible misregistration problems from one printed separation to another. The error is manifested as a "light leak" or as a visible boundary region of an undesired color.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone". Edge detection and image manipulation to perform trapping may be done in any of several processes, including for example, the technique described in U.S. Pat. No. 6,345,117 to Klassen, incorporated herein by reference.

Certain marking systems produce variations in desired output color from print engine to print engine. These variations are due to specific physical characteristics of the particular print engine. A common technique for correcting for variations in color output is to measure a set of printed colors against a set of control colors and to provide a lookup table generated from an analytic function (such as a gamma correction function) to correct for variations in color output. Thus, all print engines of a particular model can be corrected to have the same desired output color.

Certain marking systems exhibit difficulty maintaining color uniformity near edges of abutting objects on the image. For example, it may be intended to place a 75% fill, which may be possible in the body of the fill object; however, within a few millimeters of the edges, more or less than 75% may be deposited, depending on the marking process. For trapping, this can be a significant problem, as the trapping operation fundamentally only modifies edge pixels of abutting objects. If the trapping engine specifies a trap color (for a given separation) of 35%, only 20% may be produced as a result of the edge physics, for example. It is therefore desirable to have the capability to correct for these edge modulations, in order to achieve traps that are more pleasing to the eye.

The current approach to resolving this problem is to apply a gamma correction to the trap colors (gamma<1), such that the trap colors are generally forced toward the darker of the two abutting colors (see U.S. Patent Publication 2004/0114162, to McElvain). This empirical approach, while providing nominally better trap color rendering in the midtones relative to no correction, can produce excessively dark traps in many cases. Furthermore, the correction percentage would need to change based on the trap width, since the printed color should be equal to the intended color as the trap width becomes large. Therefore, it would be desirable to have a correction mechanism that is robust across all colors and trap widths, and accounts for the physical behavior of the marking process at the edges.

For xerography, average edge tangential electric fields can have a significant effect on the density of the toner cloud, as well as its proximity to the photoreceptor. Likewise at edges, field components parallel to the PR surface can give rise to toner cloud displacements, and can result in artifacts such as lead-edge and trail-edge deletions. Both these factors are manifested in the form of reduced dot gain, and partial dots at edges will be either significantly reduced in size or completely eliminated. Clearly, modeling each of these edge nonlinearities from a theoretical standpoint is a formidable task, and such a model would not be amenable to applications that require real time corrections.

Edge processing processes such as trapping and anti-aliasing are most affected by these nonlinearities. As illustrated in FIG. 1, a thin strip of an intermediate digital value (C) is placed at the position of the original intersection between two patches (A and B). Because of the edge marking nonlinearities, the actual printed toner densities in these regions can be strongly distorted, and can lead to objectionable artifacts. Clearly these effects will be compounded for intersections involving multiple color separations. In the case of trapping, an intentional multi-pixel "defect" is added at color interfaces to mitigate registration errors, where the width of the trap is determined by the maximum misregistration of the marking system. Generally, the color of this defect is chosen such that it is not objectionably visible in the presence of the original two intersecting colors. For marking processes such as xerography, the printed color of the trap region may take on an undesirable color cast in the presence of nonlinearities, thus reducing the benefit of trapping. It would therefore be desirable to apply corrections to these regions to produce the colors that were originally intended.

As previously mentioned, a correction process involving a complete description of the edge development/transfer physics may provide an accurate edge color correction, but would generally not be practical for applications that require real time correction. On the other hand, a truly empirical correction process that does not include details of the edge behavior might be computationally efficient, but would most likely provide inadequate correction in certain regions of color space.

SUMMARY

A method embodiment disclosed herein adds at least one trap area between abutting objects on an image to be printed by a printing engine. This trap area includes a central region between two outer regions. The method establishes a target toner concentration for pixels within the trap area based on toner concentrations of the abutting objects and corrects the target toner concentration to account for irregularities of the outer regions of the trap area to produce a corrected toner concentration for pixels in the trap area. The method performs this correction by first empirically testing the printing engine to establish a lookup table of correction values of the outer regions prior to a printing operation. Then, during the printing operation, the method determines a relationship between the central region and the outer regions of the trap area and calculates the corrected toner concentration based on the lookup table and the relationship between the central region and the outer regions. After the corrected toner concentration is calculated, the printing operation can be performed using the corrected toner concentration for the pixels in the trap area.

The corrected toner concentration comprises a weighted average of toner concentrations of the central region and the outer regions based on the relationship between the size of the central region and the outer regions. As the trap area increases in size, the outer regions remain approximately constant in size and the central region increases in size.

A system embodiment disclosed herein provides a tester, operatively connected to a printing engine. The tester empirically tests the printing engine prior to a printing operation of the printer to establish a first lookup table of correction values of the outer regions prior to a printing operation. A generator is also operatively connected to the printing engine. The generator is adapted to generate, during the printing operations, the trap area(s) between the abutting objects on an image. A lookup unit, which is also operatively connected to the printing engine, is used to establish the target toner concentration for pixels within the trap area based on toner concentrations of the abutting objects, using a second lookup table. Further, a processor is also operatively connected to the printing engine and is used to determine, during the printing operation, the area or size relationship between the central region and the outer regions. The system also includes a calculator used to correct the target toner concentration to account for irregularities of the outer regions of the trap area. The calculator produces the corrected toner concentration for pixels in the trap area based on the first lookup table and the relationship between the central region and the outer regions. Then the printing engine can perform the printing operation using the corrected toner concentration for the pixels in the trap area.

Also, the calculator is adapted to calculate the weighted average of toner concentrations of the central region and the outer regions based on the relationship between the central region and the outer regions (again, the weighted average is based on sizes of the central region and the outer regions).

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

Figure 1:
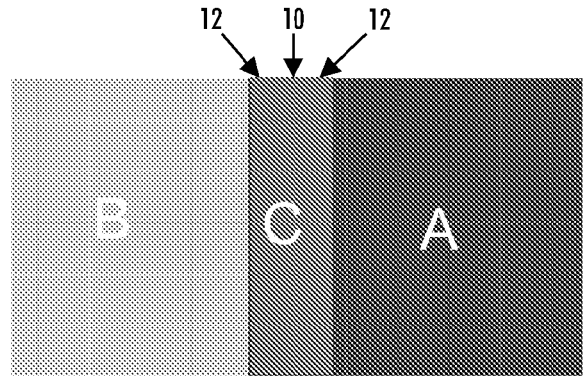
FIG. 1 is a schematic representation of a trap area added to adjacent abutting image objects.

Image object edge processes such as trapping and anti-aliasing are affected by the nonlinearities or irregularities along the borders of the trap areas. As illustrated in FIG. 1, a thin trap area strip of an intermediate digital value (C) is placed at the position of the original intersection between two image objects or patches (A and B). Because of the edge marking nonlinearities, the actual printed toner densities in these regions can be strongly distorted, and can lead to objectionable artifacts. These effects are compounded for intersections involving multiple color separations. In the case of trapping, an intentional multi-pixel "defect" or trap is added at color object interfaces to mitigate registration errors, where the width of the trap is determined by the maximum misregistration of the marking system. Generally, the color of this defect is chosen such that it is not objectionably visible in the presence of the original two intersecting colors. For marking processes such as xerography, the printed color of the trap region may take on an undesirable color cast in the presence of nonlinearities, thus reducing the benefit of trapping. It is therefore desirable to apply corrections to these regions to produce the colors that were originally intended by the trapping process.

A correction process involving a complete description of the edge development/transfer physics may provide an accurate edge color correction, but may generally not be practical for applications that require real time correction. On the other hand, a truly empirical correction process that does not include details of the edge behavior might be computationally efficient, but would most likely provide inadequate correction in certain regions of color space.

The present embodiments herein describe a method/system of color correction for trapped pixels. It assumes the existence of a conventional "trap engine" or "trap oracle" that predetermines the best trap color and size based on the colors associated with the abutting objects, and the uniform area color characteristics of the marking system. An example of such a system is described in U.S. Pat. No. 6,345,117 to Klassen.

Klassen's method computes a trap table for a predetermined set of color pairs using the CMYK-LAB (nhedra table) mapping of the marking system. This nhedra table is typically generated during the characterization of the system, and is created by measuring the color characteristics of several color patches. As these color patches can be large in comparison to edge defect zones, the nhedra table reflects the color characteristics of the body of these patches, rather than the edges. Therefore, the trap tables generated based on this data produce trap colors that do not completely reflect the edge marking response.

One attempt has been made in U.S. Patent Publication 2004/0114162, to McElvain to rectify this by applying a gamma correction (gamma<1) to the trap colors specified by the trap oracle. The gamma values are chosen for each separation, and are optimized for the midtone color pairs. Because it is fundamentally an empirical remedy, the shadows and highlights generally suffer from excessively dark traps after correction. In other words, the engine edge response is not considered, resulting in sub-optimal correction. Furthermore, the same gamma correction is applied regardless of the trap radius, which is not consistent with the expected behavior of the edges: for very large trap radii, the corrected value should equal the original value, as the edge regions become less significant relative to the overall area.

The embodiments herein apply a color correction to the trap colors, on a separation by separation basis. This model subdivides the trap into three separate regions: a central or "linear" region 10 (where the printed trap separation value is consistent or "linear" with the intended value) sandwiched between two uncoupled outer nonlinear "transitional" regions 12 (colorA-to-trapC and trapC-to-colorB). The "actual" printed trap color is then the weighted average across these three regions, and will generally be less than the intended trap color (for each separation). To ensure the intended trap color is printed for each separation, the inverse problem must then be solved, whereby an augmented input value should be chosen. In this model, the width of the transitional regions is assumed to remain constant (~50 microns for iGen3) relative to increases in trap width, so that these regions can be measured once and stored in a lookup table. An increase in trap width simply implies an increase in the width of the linear region, and a corresponding decrease in the relative weight of the transitional regions—in other words, the actual printed trap colors will asymptotically approach the intended trap colors for large trap distances, as expected. The result of this method is the creation of traps with much more accurate color rendering in comparison to the existing gamma correction method, across all colors and trap distances.

In this work, a semi-empirical approach is chosen that utilizes measurements of the printer edge characteristics. These measurements are assumed to be collected offline, and are stored in the form of a lookup table to be used at run time. The correction process uses these lookups in conjunction with fixed point iteration to solve for the corrected edge values. Because printer edge characteristics are directly used in the calculation, the process provides a correction mechanism that is robust across the device color space.

Figure 2:
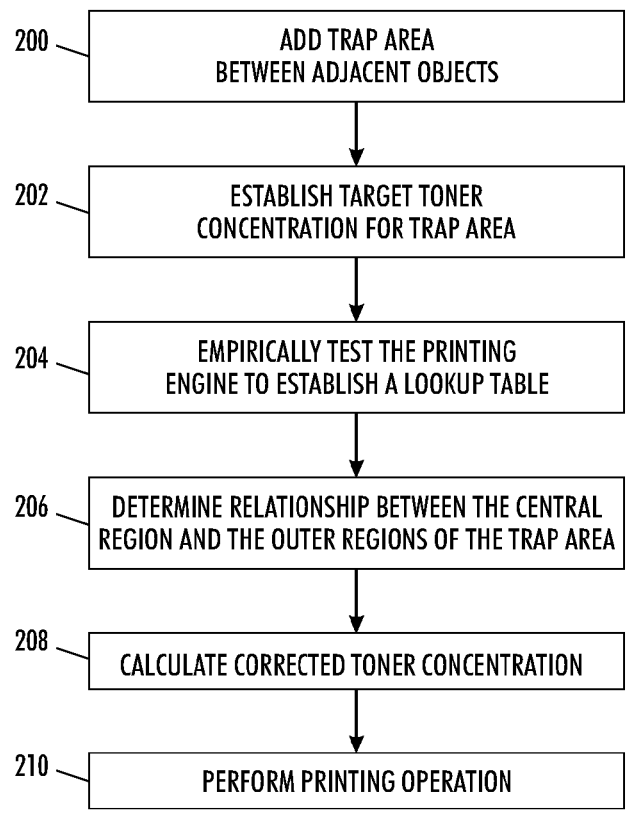
FIG. 2 is a flow chart illustrating a method embodiment.

More specifically, FIG. 2 illustrates one method embodiment disclosed herein, in flowchart form. In item 200, the method adds at least one trap area between abutting objects on an image to be printed by the printing engine. This trap area C in FIG. 1 includes a central region 10 between two outer regions 12. In item 202, the method establishes a target toner concentration for pixels within the trap area based on toner concentrations of the abutting objects, as described, for example, in U.S. Patent Publication 2004/0114162, to McElvain and U.S. Pat. No. 6,345,117 to Klassen. Basically, the target toner concentration is found by referencing a target toner concentration lookup table that has been previously established according to conventional techniques. This process notes the solid colors, tints, degrades, contone images, or "no fill" etc. of each of the adjacent shapes A and B and determines, from the target toner concentration lookup table, the width and color, tint, etc. of the trap area C.

Items 204-208 correct the target toner concentration to account for irregularities of the outer regions 12 of the trap area. These processes produce a corrected toner concentration for pixels in the trap area. As shown in item 204, the method performs this correction by first empirically testing the printing engine to establish another lookup table of correction values (e.g., the correction values lookup table) of the outer regions 12 prior to the printing operation. The empirical testing performed in item 204 can be performed at any time before item 208 needs to reference the correction values lookup table. Therefore, the empirical testing performed in item 204 can be performed before or after items 200, 202, 206, etc.

One example of such empirical testing is illustrated in FIGS. 4-13, and is discussed in detail below. Basically, this empirical testing examines the appearance of the pixels in the outer regions 12 of the trap area and determines (for a given trap area color, tint, etc. and abutting objects solid colors, tints, degrades, contone images, or "no fill", etc.) how greatly the appearance of the pixels in the outer regions of the trap area will diverge from the pixels in a central region 10 of the trap area. Depending upon the colors, tints, etc. of the trap area C and the colors, tints, etc. of the abutting the adjacent object (A or B), the method defines a fixed size for the outer regions 12, which can also be predetermined and based upon previous empirical testing (for the given printing engine, or for classes of printing engines). These correction values are recorded in the correction values lookup table. The empirical testing performed in item 204 can be performed a single time for a given printing engine or type of printing engine (e.g., when the printing engine is first manufactured), or can be performed periodically such as according to a regular schedule or when automated testing indicates that the quality of the printing engine has decreased below a predetermined standard. Alternatively, the empirical testing can be performed in response to user instructions, such as when an extremely high quality print job is being requested. Therefore, in some embodiments, the correction values lookup table can be constantly updated.

Then, during the printing operation, as shown in item 206 the method determines the size relationship between the central region 10 and the outer regions 12 of the trap area. As the trap area increases in size, the outer regions 12 remain approximately constant in size and the central region 10 increases in size. Therefore, the corrected toner concentration comprises a weighted average of toner concentrations of the central region 10 and the outer regions 12 based on the relationship between the central region 10 and the outer regions 12. Thus, the amount of toner concentration correction produced by the correcting/testing process varies depending upon characteristics of the abutting objects. This weighted average is based on the different sizes of the central region 10 and the outer regions 12. In other words, as the central region 10 increases in size, because the size of the outer regions 12 remain approximately constant, the application of the correction factor (read from the correction values lookup table that relates to the outer regions 12) becomes smaller and smaller. Thus, as the size of the central region 10 increases with respect to the outer regions 12, the weighting of the correction factor for the outer regions becomes less and less.

In item 208, the method calculates the corrected toner concentration based on the correction factor taken from the correction values lookup table weighted according to the size relationship between the central region 10 and the outer regions 12. After the corrected toner concentration is calculated, the printing operation can be performed using the corrected toner concentration for the pixels in the trap area, as shown in item 210.

Figure 3:
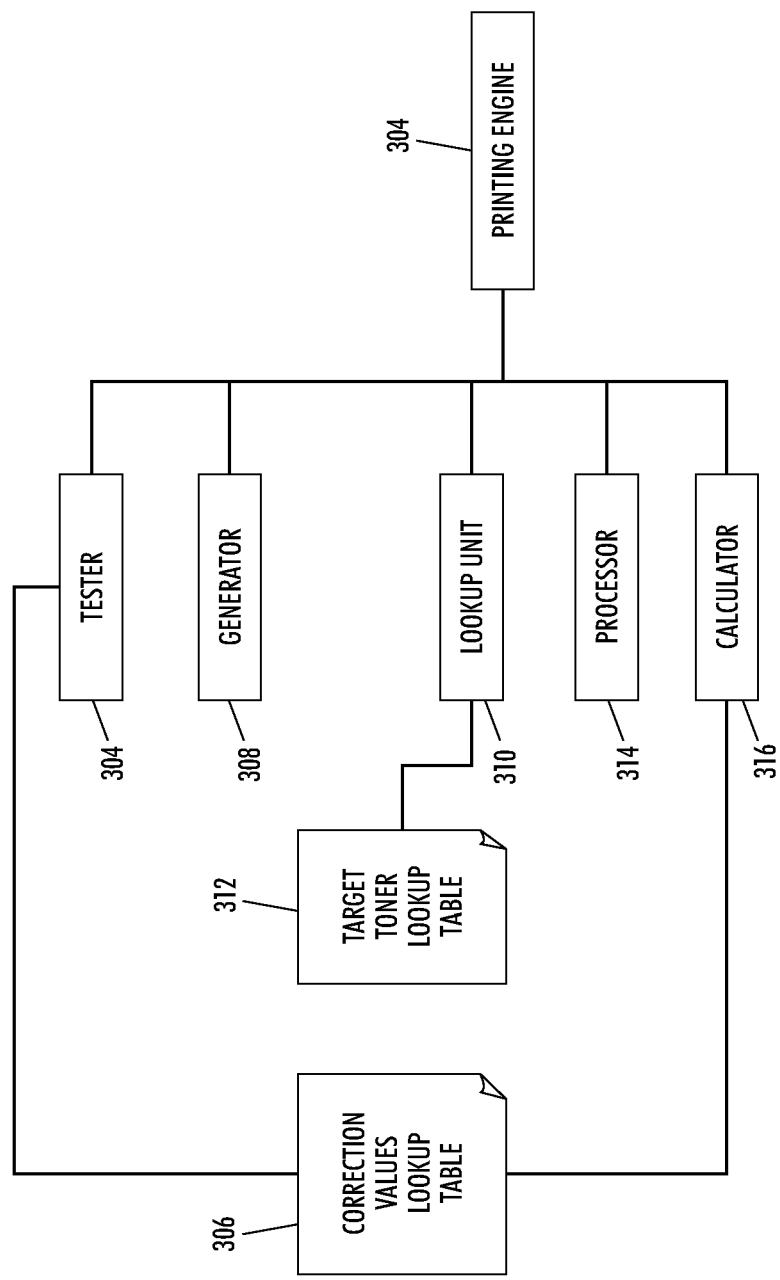
FIG. 3 is a schematic representation of a hardware system embodiment.
Figure 4:
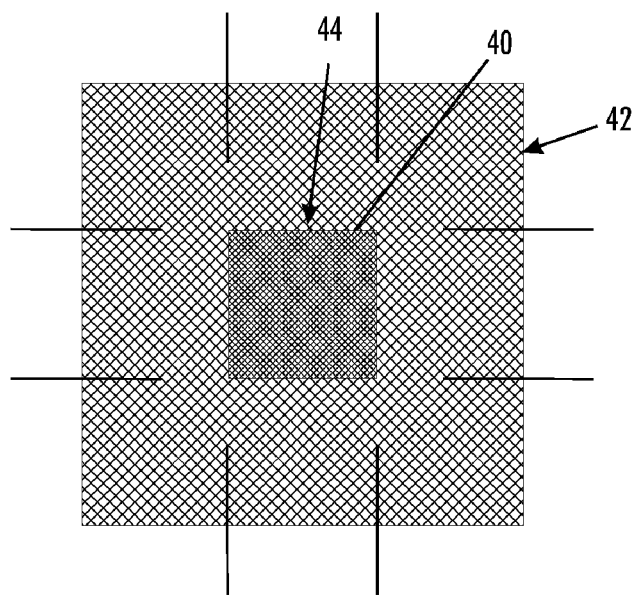
FIG. 4 is a schematic representation of tests patch used for edge characterization measurements.

A system embodiment is shown in FIG. 3. As would be understood by one ordinarily skilled in the art, many of the items shown in FIG. 3 are conventional devices readily available in the marketplace. Therefore, a detailed schematic and description of the internal workings and internal features of each of the devices is not included herein. Further, such devices could comprise hardware items, such as programmed logic circuits, read only memory (ROM) devices, comparators, latches, logical AND, OR, NAND, NOR, devices, etc. Additionally, many of the devices shown in FIG. 3 could comprise software items such as software programs stored on electronic media, which cause a processing device to perform logical operations. Note that all items are interconnected by wiring or a network in FIG. 3.

The system includes a tester 302, operatively connected to a printing engine 304. The tester 302 empirically tests the printing engine 304 prior to the printing operation of the printer 304 to establish a first lookup table 306 of correction values of the outer regions. Therefore, the first lookup table 306 corresponds to the correction values lookup table, discussed above. The tester 302 could comprise a logical hardware device or a software program. One example of such a tester 302 is discussed generally above, with respect to FIG. 2, and more specifically below, in the example shown in FIGS. 4-13. The printing engine 304 can comprise any form of printing engine including a xerographic printing engine, laser printing engine, dot matrix printing engine, thermal transfer printing engine, etc.

A generator 308 is also operatively connected to the printing engine 304. The generator 308 is adapted to generate, during the printing operations, the trap area(s) between the abutting objects on an image. A lookup unit 310, which is also operatively connected to the printing engine 304, is used to establish the target toner concentration for pixels within the trap area based on toner concentrations of the abutting objects, using a second lookup table 312. The generator 308 could comprise a logical hardware device or a software program and is more fully described in U.S. Patent Publication 2004/0114162, to McElvain and U.S. Pat. No. 6,345,117 to Klassen.

Further, a processor 314 is also operatively connected to the printing engine 304 and is used to determine, during the printing operation, the area or size relationship between the central region and the outer regions. The system also includes a calculator 316 used to correct the target toner concentration to account for irregularities of the outer regions of the trap area. The calculator 316 produces the corrected toner concentration for pixels in the trap area based on the first lookup table 306 and the size relationship (weighting) between the central region and the outer regions. The amount of toner concentration correction produced by the tester 302 will thereby vary depending upon characteristics of the abutting objects. Thus, the calculator 316 multiplies the target toner concentration for the trap area taken from the target toner lookup table 312 by the weighted correction value (factor) taken from the correction values lookup table 306. A more specific example of the operation of the calculator 316 is shown below in FIGS. 4-13. Then, the printing engine 304 can perform the printing operation using the corrected toner concentration for the pixels in the trap area. The processor 314 and calculator 316 again can comprise hardware devices or software programs, as would be understood by one ordinarily skilled in the art.

Again, the tester 302 is adapted to perform an iterative empirical testing process. Also, the calculator 316 is adapted to calculate the weighted average of toner concentrations of the central region and the outer regions based on the size relationship between the central region and the outer regions (again, the weighted average is based on sizes of the central region and the outer regions).

FIGS. 4-13 illustrate one non-limiting example of the operations of the tester 304, processor 314, calculator 316, and the data that would go into the lookup table 306. In this example, in order to characterize the edge nonlinearities, a PostScript test master was created for each cyan, magenta, yellow, and black separations. Each master contained 84 target patches, and each patch (FIG. 4) consisted of a large (¼ inch) central uniform region 40 (contone value A) surrounded by a larger (¾ inch) uniform patch 42 (contone value B). Placed at the interface between A and B was a thin border 44 of width 0.005 inches, with a contone value C; alignment marks were also positioned to enable facile location of the this border region during analysis. For the 84 patches, the contone values were ramped in 14.3% increments, with the condition that $B<C \leqq A$.

Figure 5:
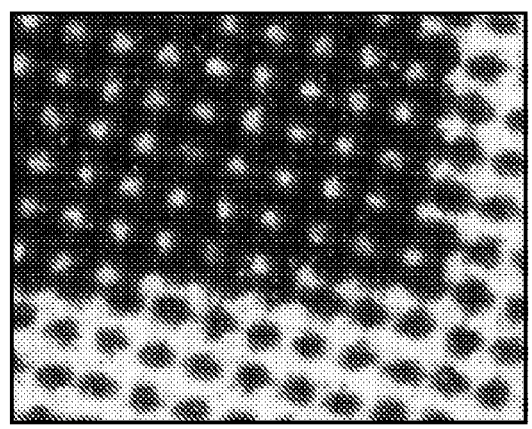
FIG. 5 is a schematic representation of a portion of a patch measured with a scanner.

The 4 masters were then printed on a Xerox iGen3 color digital press, with a 600 dpi resolution, using a 170 cpi halftone. The width of the border region C was therefore equal to exactly 3 pixels in the final prints. Each of these targets was then scanned using a Crossfield 6180 drum scanner, at an approximate resolution of 8700 dpi. The resulting files were converted from RGB to CMYK in-situ by the scanner software, resulting in uncompressed file sizes of approximately 300 MB for each patch. A portion of one of these scans is shown in FIG. 5, and shows the detailed halftone structure. In total, 336 of theses patches were scanned. In FIG. 5, the alignment marks are used to locate the interface region.

Although great care was taken during the scanning to align the patches relative to the scan axes, it was still necessary to rotate and deskew the images by small amounts to compensate for image warping common to xerographic systems. Both of these operations were enabled by the placement of alignment marks on each patch, and the rotation/skew angles never exceeded 1° for all separations.

Figure 6:
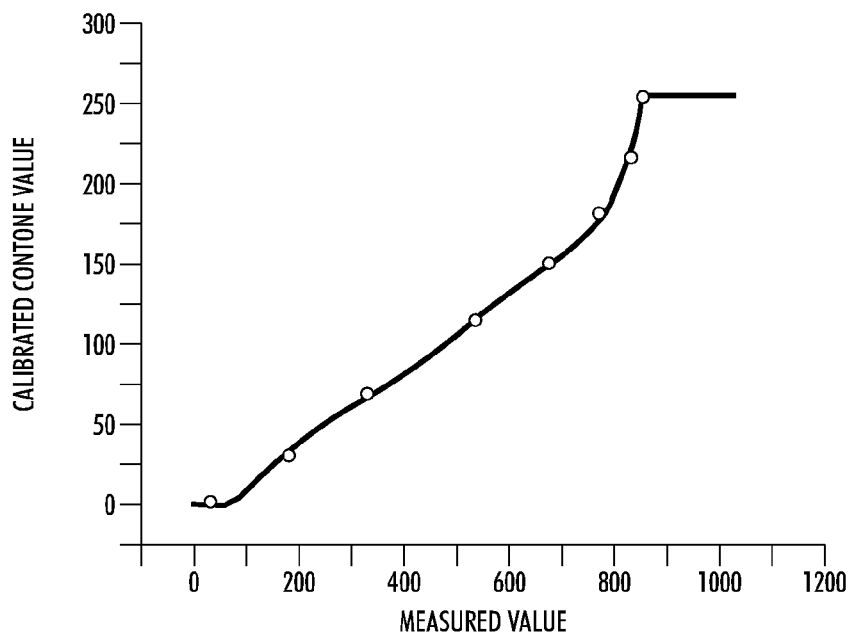
FIG. 6 is a schematic representation of a calibration curve.

The regional scanned halftone values were converted to contone values by computing the mean value digital value within a given window, where the window was assumed to include many halftone cycles. Although the scanned data values result from a convolution of the scanner modulation transfer function (MTF) with the actual printed halftones, it is a fairly good measure of the halftone fill factor. The mean value was measured for each of the large uniform patch regions (A or B), each of which had a known digital input value (as specified in the PostScript master). This enabled the construction of an 8 node calibration lookup table, which was interpolated using a least squares fit to a 6th order polynomial function in order to estimate the calibration for points between nodes. The calibration curve for the K separation is shown in FIG. 6.

Figure 7:
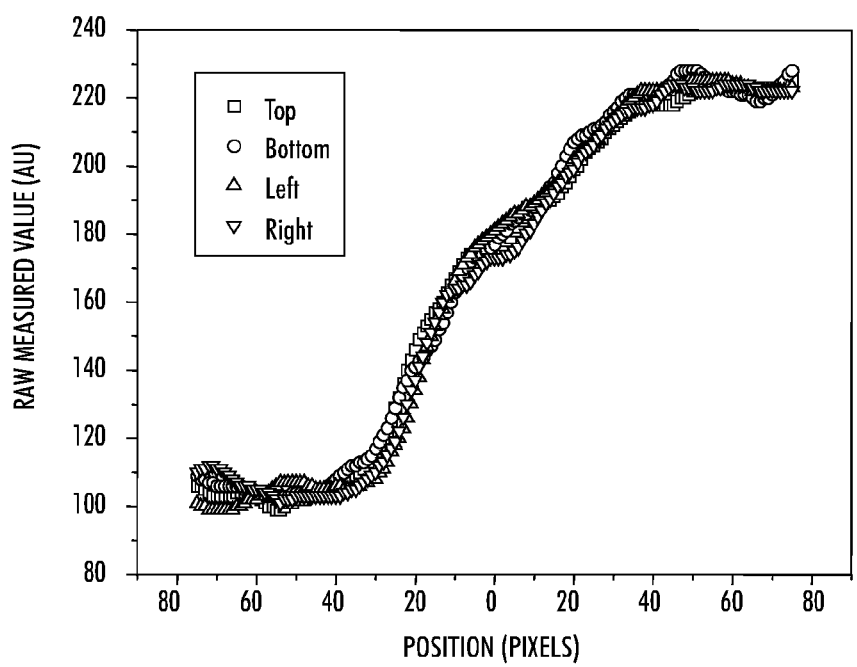
FIG. 7 is a schematic representation of scan profiles of different faces of a patch.

For each patch, the behavior in the vicinity of the border region C was measured for the top, bottom, left, and right edges. This was accomplished by choosing a window with a height (width) approximately equal to the inner patch dimension (~2000 pixels @8700 dpi), and a width (height) equal to 3 pixels @8700 dpi). The window was then slewed from −75 to +75 pixels relative to the center of the border region C (determined by the alignment marks). FIG. 7 shows an example scan for the same patch for the top, bottom, left, and right edges for a K patch with A=57%, B=28%, and C=43%. As can be seen from the figure, the edge response is very similar for the four faces, suggesting minimal lead- and trail-edge deletion effects.

Figure 8:
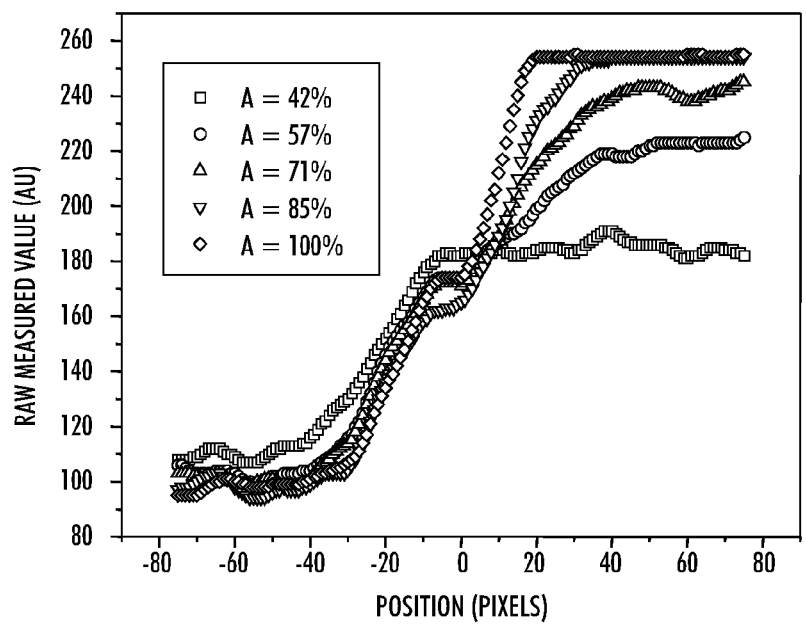
FIG. 8 is a schematic representation of plots of transition profiles for various patches.

FIG. 8 compares the transition profiles for different patches with B=28%, C=43% common for all patches, and A ranging from 43% to 100%. For reference, the solid line shows the theoretical response for an "ideal" halftoned border region using the measurement technique described above. Interestingly enough, the curves all have the same qualitative features in the vicinity of region C. At the center of C is a relatively flat "linear" region approximately 6 pixels wide, surrounded by two "nonlinear" regions that show toner densities above or below that of the central region. The 6 pixel central region is referred to as "linear", since its measured value corresponds to that which would be obtained with a large area patch; in other words, its response is linear.

Based on the observations regarding the qualitative profile behavior, a simple model can be constructed to describe the "average" toner density as seen by an observer. The border region can be subdivided into three decoupled sub-regions, and the average value can be described by the following expression:

$$C_\alpha^A = w_\alpha^{NL} f_\alpha(A_\alpha, C_\alpha^I) + w_\alpha^L C_\alpha^I + w_\alpha^{NL} f_\alpha(B_\alpha, C_\alpha^I) \quad (1)$$

$A_\alpha$ and $B_\alpha$ are the input values for separation α for regions A and B, respectively, and $C_\alpha^A$, $C_\alpha^I$ are the average printed and the "intended" input levels for the border region. The coefficients $w_\alpha^L$ and $w_\alpha^{NL}$ correspond to the weights of the linear and two nonlinear regions, and are equal to the percentage of the total border region each occupies. It has been implicitly assumed here that the weights of the two nonlinear regions are the same. The function $f_\alpha(x,y)$ describes the average measured value of the nonlinear regions, given an interface involving input levels x and y.

If the further assumption is made that the width of the nonlinear region is a constant ($t_{NL} \approx 50$ μm), the linear and nonlinear weights can be expressed in terms of the total width, T, of the border region:

$$w_\alpha^{NL} = t_{NL}/T, \quad w_\alpha^L = 1 - 2w_\alpha^{NL} \quad (2)$$

provided $0 \leq w_\alpha^{NL} \leq 0.5$. A constant nonlinear region width implies its contribution to the overall printed level of the border is reduced as the border width increases; in other words, the printed level should approach that of a uniform patch for large border widths, an intuitive result.

With knowledge of the behavior at the nonlinear regions, one can then predict the average toner density for border regions given the input contone levels and the border width. However, from the standpoint of correction the reverse problem must be solved: what is the input (or corrected) border value that will give rise to the desired border value? Equation 2 can be modified to describe this problem mathematically:

$$C_\alpha^T = w_\alpha^{NL} f_\alpha(A_\alpha, C_\alpha^C) + w_\alpha^L C_\alpha^C + w_\alpha^{NL} f_\alpha(B_\alpha, C_\alpha^C) \quad (3)$$

where $C_\alpha^T$ and $C_\alpha^C$ are the target printed value and the corrected input value, respectively.

Clearly Equation 3 cannot generally be solved by analytic means, but it can be recast into a more convenient form using Equation 2:

$$C_\alpha^C = C_\alpha^T + w_\alpha^{NL} [F_\alpha(A_\alpha, C_\alpha^C) + F_\alpha(B_\alpha, C_\alpha^C)] \quad (4)$$

where $$F_\alpha(x,y) = y - f_\alpha(x,y) \quad (5)$$

The function $F_\alpha(x,y)$ can be thought of as a measure of the departure from linearity for the "nonlinear" region of the border area. $F_\alpha(x,y)=0$ implies the entire border region exhibits a linear response, and therefore $C_\alpha^C = C_\alpha^T$; no correction is required. Fixed point iteration can be used to solve Equation 4, with convergence guaranteed as long as the following condition is satisfied:

$$w_\alpha^{NL} \partial/\partial C_\alpha^C \{F_\alpha(A_\alpha, C_\alpha^C) + F_\alpha(B_\alpha, C_\alpha^C)\} < 1 \quad (6)$$

Considering this correction model, it is therefore only necessary to measure the response of the nonlinear regions as a function of the input values present at the border (A,B,C), and use these values to compute $F_\alpha(x,y)$.

Figure 9:
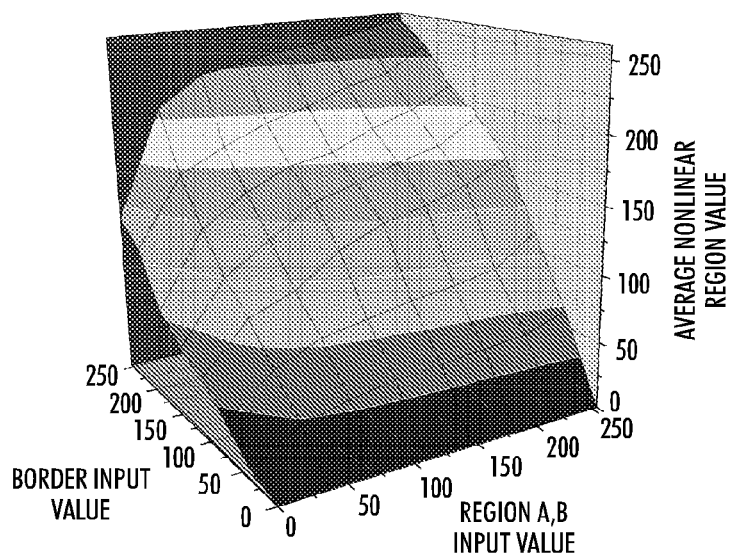
FIG. 9 is a schematic representation of a three-dimensional plot of measured nonlinear values for various node points.

Using the collected interface data described above, the average values for the nonlinear region were measured for each of the patches. Prior to computing theses averages, the data were converted using the calibration tables. Each of the four sides of each patch were used to obtain an average value for the two nonlinear regions $f_\alpha(i,j)$ and $f_\alpha(k,j)$, where i and k correspond to the indices for region A and B, respectively, and j corresponds to the index for the border ($0 \leq i,j,k \leq 7$). Therefore, these measurements created an 8×8 table for $f_\alpha(x,y)$. For those patches that yielded duplicate measurements of a particular $f_\alpha(x,y)$, the results were averaged over the number of duplications. FIG. 9 shows a 3-dimensional plot of the $f_\alpha(x,y)$ measurements for the K separation. As expected, the table is monotonic in both x and y. Furthermore, for a fixed border value C, $f_\alpha(x,y)$ increases sharply with increasing A (or B) for A,B<C, and saturates for values A,B>C This is significant, as it implies the printed border value is more severely impacted against a lighter value (lower halftone fill factor) in comparison to a darker value.

The 8×8 nonlinear region tables were then interpolated to produce a 256×256 lookup table (compatible with 8 bit contone values); these were subsequently converted to "nonlinear departure" tables F[i,j], to be used for the run-time correction process. A discrete version of Equation 4, invoking the fixed-point process, was used to compute the corrections, shown below:

$$c[i+1] = c_1 + w_{NL}\{F[a,c[i]] + F[b,c[i]]\} \quad (7)$$

where $c_1$ is the target printed digital value, a and b are the digital values corresponding to regions A and B, and c[i] is the ith iteration of the fixed point solution to the corrected value. Iteration continues until $|c[i]-c[i-1]|<tol$. Due to the quantization errors associated with the indexing of F in Equation 7, the tolerance was set to a value of 6 to avoid oscillatory behavior. For all interface combinations tested, no more than three iterations were required, with most finding convergence in two iterations.

Figure 10:
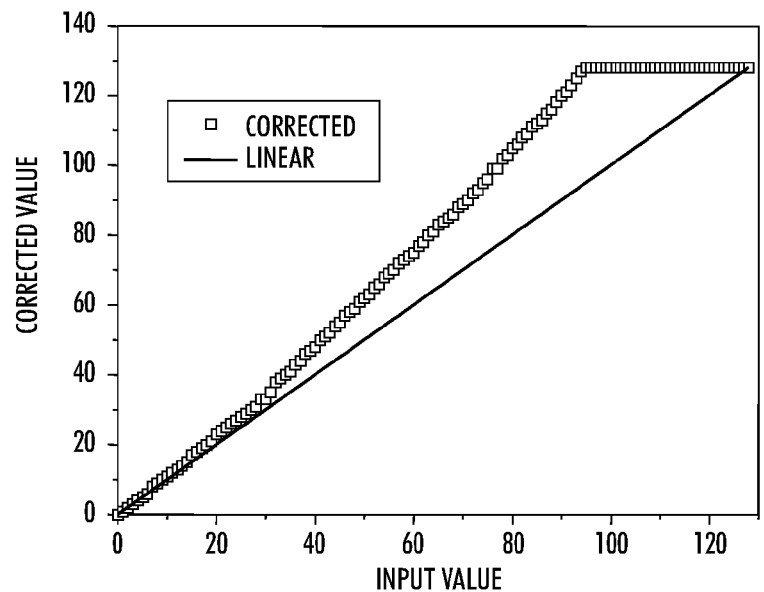
FIG. 10 is a schematic representation of a plot of corrected contone values.
Figure 11:
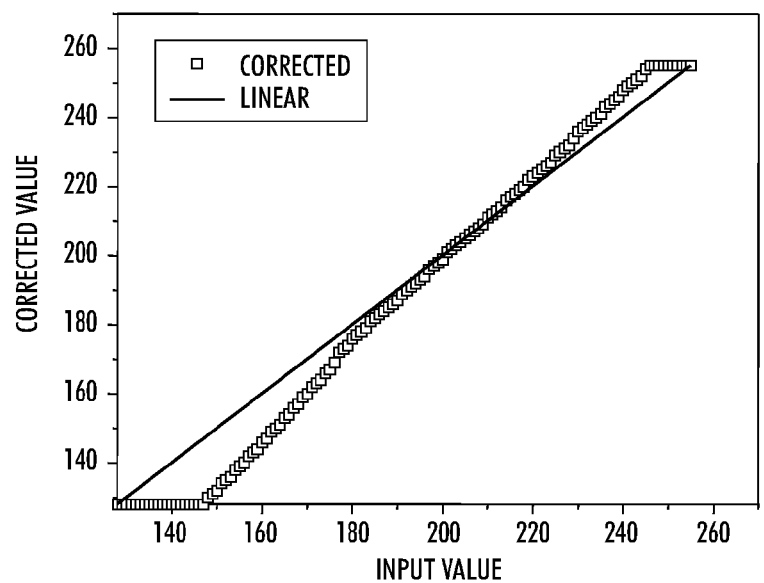
FIG. 11 is a schematic representation of a plot of corrected contone values.
Figure 12:
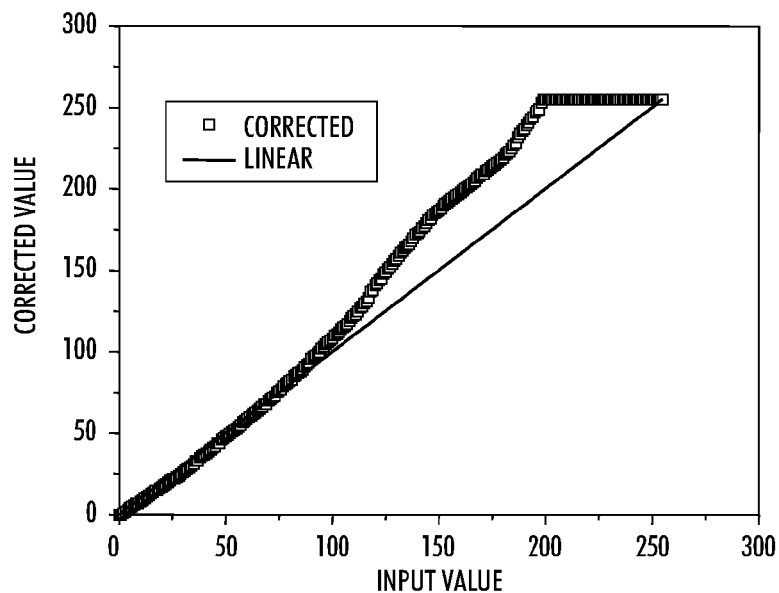
FIG. 12 is a schematic representation of a plot of corrected contone values.
Figure 13:
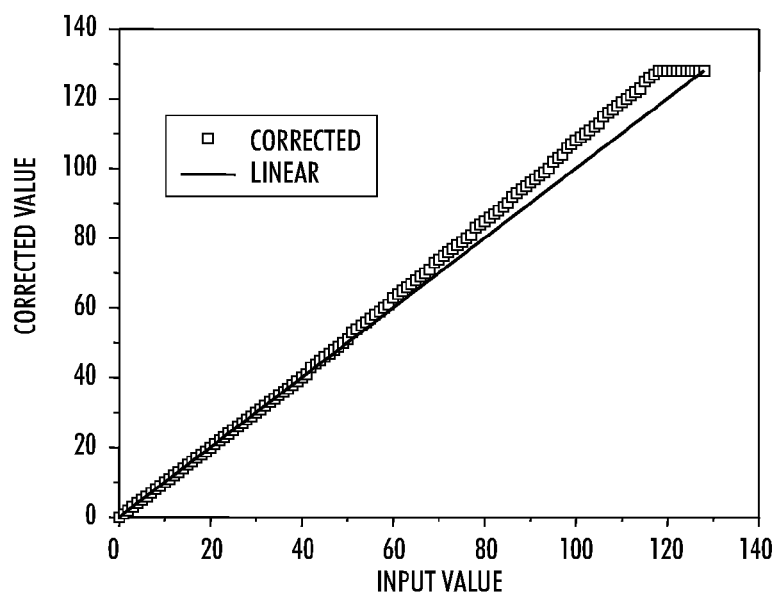
FIG. 13 is a schematic representation of a plot of corrected contone values.

The process was tested for border widths of 3 pixels (@600 dpi), assuming a linear width equal to 17 μm. FIGS. 10, 11 and 12 show the results of such calculations, for a variety of (A,B) combinations. More specifically, in FIG. 10, A.=128, B=0; in FIG. 11, A.=255, B=128; and in FIG. 12, A.=255, B=0. Note that in all cases, the corrected border values were constrained to lie within [a,b]. For B=0 (FIGS. 10 and 12), the corrected value is greater than the input value throughout the entire range. However, for B≠0 (this 11) the correction value is actually less than the input until approximately the midpoint, after which the correction becomes greater than the input. In this case, region A creates a gain in the adjacent nonlinear region that is greater than the loss of the nonlinear region adjacent to B. For comparison, FIG. 13 shows the case where A=128, B=0, with a border width of 10 pixels (@600 dpi). Clearly, the correction is relatively small in comparison to a border width of 3 (FIG. 10), a result that is consistent with intuition; the correction delta should approach zero for large border regions.

Thus, as shown above, in this example, edge characteristics of a xerographic printer were measured, with the goal of quantifying edge nonlinearities. A simple model was constructed to describe the change in printed toner density for a thin border region surrounded by larger patches. The model was subsequently used to develop a real time correction process that utilized the edge nonlinearity measurements. For a border width of 3 pixels, these corrections were shown to be significant, and strongly dependent on the levels of the surrounding patches. Furthermore, it was shown that for larger border widths, the correction was much smaller, consistent with expectations.

While the above examples assumed a constant (and equal) width for the nonlinear regions 12, for halftoned edges transitioning to white, this may be inadequate, since partial dot loss in these cases may be more severe, and the "nonlinear" regions may be pushed much deeper into the edge. Therefore, the embodiments herein can also incorporate a variable nonlinear region 12 width (depending on the value of region A or B) using yet another lookup table (or adding information to the previously described lookup tables), which would result in a stronger correction. Again, the values for this lookup table would be determined empirically using testing that occurred prior to actual printing operations.

Thus, as shown in this example, measurement/calculation of the transitional values (lookup table) and the transitional width is performed for each separation and each halftone offline (before printing operations). At the start of each page to be printed, the method computes the transitional weight from the trap radius using Equation 2. Note this value will decrease with increasing trap radius. For each initial color pair a,b and trap color specified by the trap oracle, the method calculates the corrected trap color using fixed point iteration of Equation 4, on a separation by separation basis. Note different trap radii will yield different correction values.

Some benefits of this approach are that it incorporates engine edge response into the correction calculation, it uses the same correction lookup table for all trap widths, it computes different correction depending on trap width: larger trap widths yield smaller corrections, it produces trap image quality equal or superior to existing gamma correction, and the fixed point implementation is efficient—less than 1% performance degradation.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A machine-implemented method comprising:
    using said computer, adding at least one trap area between abutting objects on an image to be printed by a printing engine, wherein said trap area includes a central region between two outer regions;
    using said computer, establishing a target toner concentration for pixels within said trap area based on toner concentrations of said abutting objects;
    using said computer, correcting said target toner concentration to account for irregularities of said outer regions of said trap area to produce a corrected toner concentration for pixels in said trap area in a process using a lookup table of correction values of said outer regions and a relationship between said central region and said two outer regions; and
    using said printing engine, performing printing using said corrected toner concentration for said pixels in said trap area; and
    wherein as said trap area increases in size, said outer regions remain approximately constant in size and said central region increases in size.

2. The method according to claim 1, wherein an amount of toner concentration correction produced by said correcting process varies depending upon characteristics of said abutting objects.

3. The method according to claim 1, wherein said corrected toner concentration comprises a weighted average of toner concentrations of said central region and said outer regions.

4. The method according to claim 3, wherein said weighted average is based on sizes of said central region and said outer regions.

5. A machine-implemented method comprising:
    using said computer, adding at least one trap area between abutting objects on an image to be printed by a printing engine during a printing operation, wherein said trap area includes a central region between two outer regions;
    using said computer, establishing a target toner concentration for pixels within said trap area based on toner concentrations of said abutting objects;
    using said computer, correcting said target toner concentration to account for irregularities of said outer regions of said trap area to produce a corrected toner concentration for pixels in said trap area in a process comprising:
    empirically testing said printing engine to establish a lookup table of correction values of said outer regions prior to said printing operation;
    determining, during said printing operation, a relationship between said central region and said outer regions; and
    calculating, during said printing operation, said corrected toner concentration based on said lookup table and said relationship between said central region and said outer regions; and
    using said printing engine, performing said printing operation using said corrected toner concentration for said pixels in said trap area; and
    wherein as said trap area increases in size, said outer regions remain approximately constant in size and said central region increases in size.

6. The method according to claim 5, wherein an amount of toner concentration correction produced by said empirically testing process varies depending upon characteristics of said abutting objects.

7. The method according to claim 5, wherein said corrected toner concentration comprises a weighted average of toner concentrations of said central region and said outer regions based on said relationship between said central region and said outer regions.

8. The method according to claim 7, wherein said weighted average is based on sizes of said central region and said outer regions.

9. A system comprising:
    a printing engine;

a generator, operatively connected to said printing engine, adapted to generate, during a printing operation, at least one trap area between abutting objects on an image to be printed by said printing engine, wherein said trap area includes a central region between two outer regions;

a lookup unit, operatively connected to said printing engine, adapted to establish a target toner concentration for pixels within said trap area based on toner concentrations of said abutting objects, using a lookup table based on a relationship between said central region and said two outer regions; and a calculator adapted to correct said target toner concentration to account for irregularities of said outer regions of said trap area to produce a corrected toner concentration for pixels in said trap area, wherein said printing engine is adapted to perform said printing operation using said corrected toner concentration for said pixels in said trap area; and wherein as said trap area increases in size, said outer regions remain approximately constant in size and said central region increases in size.

10. The system according to claim 9, wherein an amount of toner concentration correction produced by said calculator varies depending upon characteristics of said abutting objects.

11. The system according to claim 9, wherein said calculator is adapted to calculate a weighted average of toner concentrations of said central region and said outer regions.

12. The system according to claim 11, wherein said weighted average is based on sizes of said central region and said outer regions.

13. A system comprising:

a printing engine;

a tester, operatively connected to said printing engine, adapted to empirically test said printing engine prior to a printing operation of said printer to establish a first lookup table of correction values of said outer regions prior to a printing operation, a generator, operatively connected to said printing engine, adapted to generate, during said printing operations, at least one trap area between abutting objects on an image to be printed by said printing engine, wherein said trap area includes a central region between two outer regions;

a lookup unit, operatively connected to said printing engine, adapted to establish a target toner concentration for pixels within said trap area based on toner concentrations of said abutting objects, using a second lookup table;

a processor, operatively connected to said printing engine, adapted to determine, during said printing operation, a relationship between said central region and said outer regions; and a calculator adapted to correct said target toner concentration to account for irregularities of said outer regions of said trap area to produce a corrected toner concentration for pixels in said trap area based on said first lookup table and said relationship between said central region and said outer regions, wherein said printing engine is adapted to perform said printing operation using said corrected toner concentration for said pixels in said trap area; and wherein as said trap area increases in size, said outer regions remain approximately constant in size and said central region increases in size.

14. The system according to claim 13, wherein an amount of toner concentration correction produced by said tester varies depending upon characteristics of said abutting objects.

15. The system according to claim 13, wherein said calculator is adapted to calculate a weighted average of toner concentrations of said central region and said outer regions based on said relationship between said central regions and said outer regions.

16. The system according to claim 15, wherein said weighted average is based on sizes of said central region and said outer regions.

* * * * *